Patented Oct. 5, 1948

UNITED STATES PATENT OFFICE 2,450,497

PHENOXYPHENYL PROPYL AMINES

Robert Biedermann, Basel, Switzerland, assignor to J. R. Geigy A.-G., Basel, Switzerland, a Swiss firm No Drawing. Application May 7, 1946, Serial No. 667,999. In Switzerland May 8, 1945

4 Claims. (Cl. 260—570.8)

It has been found that therapeutically valuable compounds which are araliphatic amines of the general formula

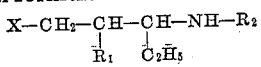

wherein

X means either an unsubstituted diphenyl ether radical or diphenyl ether radical substituted for instance by alkyl, alkoxy or hydroxy groups,
$R_1$ means hydrogen or an alkyl radical, and
$R_2$ means hydrogen or an alkyl radical, will be obtained by converting ketones of the general formula

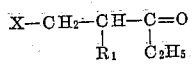

wherein X and $R_1$ have the above defined meanings, in a conventional manner into the corresponding amines and, if necessary, transforming the substituents present in the diphenyl ether radical X in any desired manner and, if desired, substituting the amino group in accordance with the above definition, if the latter is a primary amino group.

The new compounds claimed herein possess improved analgetic properties when compared with similar compounds known hitherto. The claims hereunto appended are directed to those preferred compounds which, more particularly, are araliphatic amines corresponding to the formula

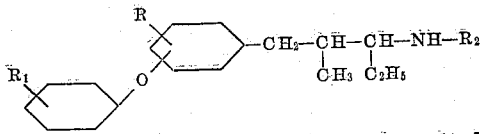

wherein R is hydrogen or methoxy, $R_1$ is hydrogen, methyl or methoxy, and $R_2$ is methyl or ethyl.

The conversion of the above defined ketones into the corresponding primary or secondary amines can be effected according to the most various known methods. Secondary amines may preferably be produced by treating the ketones with reducing agents, like amalgamated aluminium or catalytically activated hydrogen, in the presence of the amines to be introduced. When working according to the catalytic hydrogenation method in the presence of ammonia primary amines may also be made. The Leuckart's method can be used for the production of primary and secondary amines. According to this method the above defined ketones are condensed with formamide or with the formyl compounds of monoalkylamines and the resulting formyl compounds of the amines saponified to give the free amines. Furthermore, the ketones can be reduced to the secondary alcohols, the latter being then esterified by means of a hydrohalogenic acid and the resulting esters interacted with ammonia or monoalkylamines. Primary amines of the above defined formula may also be obtained from the oximes or hydrazones of the ketones by reducing the latter. Finally there may be mentioned that unsaturated ketones can be converted into the corresponding amines according to any one of the above described methods of hydrogenating amination, while simultaneously saturating the double bond.

Secondary amines may also be obtained by alkylation of the corresponding primary amines, as has already been mentioned above. For such a substitution of the amino group the known methods may be used; the most convenient method is that consisting in the interaction with hydrohalogenic esters or with sulfuric esters of alcohols or the interaction with aldehydes or ketones with reduction and the like. If desired, groups present in the diphenyl ether radical can also be transformed after the amination. As examples may be mentioned: the conversion of the nitro group over the amino group into the hydroxy group, the splitting of alkoxy groups, saponification of acyloxy groupings to hydroxy groups and so on. If halogen atoms linked to an aromatic radical are present in the starting materials, the same can be replaced simultaneously with other operations, for instance with the reduction of Schiff's bases occurring as intermediate products, or also in a single operation by means of hydrogen.

The ketones used as starting materials—as far as the same are unknown—can be prepared for instance by aralkylation of ketones containing replaceable hydrogen at an $\alpha$-carbon atom.

The invention will now be illustrated by the following examples without being limited thereto; the parts are by weight.

Example 1

20 parts of 1-[4'-(4''-methoxyphenoxy)-phenyl]-pentanone-(3) (made by condensation of 4-(4'-methoxyphenoxy)-benzaldehyde with methyl ethyl ketone and by subsequent hydrogenation of the double bond) and 10 parts of an aqueous 41% methylamine solution are dissolved in 150 parts of 94% alcohol and treated at 50–60° C. with 7 parts of amalgamated aluminium. After completion of the reaction the resulting aluminium hydroxide is filtered off, the filtrate being then evaporated. The base is dissolved in dilute hydrochloric acid, the non-basic ingredients present therein are removed by extraction of the solution with ether, the base again made free by means of a sodium hydroxide solution and again extracted with ether. The resulting ethereal solution is dried with anhydrous sodium sulfate, the solvent expelled and the free base distilled in high-vacuo. The 1-[4'-(4''- methoxyphenoxy)-phenyl] - 3 - N-methylaminopentane boils at 152° C. under a pressure of 0.03 mm.

The same final product is also obtained by aminating hydrogenation of 4-(4'-methoxyphenoxy)-styrylethylketone in the presence of platinum oxide. In an analogous manner the methoxy group can be split by means of hydrobromic acid.

*Example 2*

20 parts of 1-[4'-(4''-methoxyphenoxy)-phenyl]-2-methylpentanone-(3) (prepared from 4-(4'-methoxyphenoxy)-benzyl chloride and diethyl ketone in toluene in the presence of sodium amide) together with 9 parts of an aqueous 66% ethylamine solution are dissolved in 150 parts of 94% alcohol and treated at 50–60° C. with 7 parts of amalgamated aluminium. Working up is then effected in the manner described in Example 1. Instead of amalgamated aluminium, there may also be used platinum oxide for hydrogenation purposes. The obtained 1-[4'-(4''-methoxyphenoxy)-phenyl] - 2 - methyl - 3 - N-ethylaminopentane distills at 163° C. under 0.1 mm. pressure.

The 1-[4'-(4''-ethoxy-phenoxy)-phenyl] - 2-methyl-3-N-ethylaminopentane can be obtained in an analogous manner.

*Example 3*

20 parts of 1-[4'-(4''-methoxyphenoxy)-phenyl]-2-methyl-pentanone-(3) are heated for 3 hours to 165–170° C. with 24 parts of formamide. After cooling to 80° C. the formyl compound is treated with 100 parts of concentrated hydrochloric acid and the whole subjected to hydrolysis by heating under reflux for 3 hours. Then it is allowed to cool, diluted with water and the base made free by means of concentrated caustic soda lye. Then it is extracted with ether, the ether distilled off and the residue dissolved in dilute hydrochloric acid. This hydrochloric acid solution is treated with animal charcoal, filtered and the base again set free by means of caustic soda lye. It is extracted once more with ether, the ethereal solution dried over anhydrous Glauber's salt, the ether subsequently distilled off and the base fractionated. The resulting 1-[4'-(4''-methoxyphenoxy)-phenyl] - 2 - methyl-3-aminopentane distils at 164° C. under a pressure of 0.2 mm.

The same product is also obtained by reduction of the oxime of the 1-[4'-(4''-methoxyphenoxy)-phenyl]-2-methylpentanone-(3) by means of sodium amalgam in glacial acetic acid.

The resulting primary amine can be alkylated with formaldehyde in the presence of a reducing agent, like amalgamated aluminium.

In the same manner as that described in the above example there may be produced the 1-[4'-(4''-ethoxyphenoxy) - phenyl] - 2 - methyl - 3-aminopentane.

*Example 4*

20 parts of 1-[4'-(4''-aminophenoxy)-phenyl]-2-methyl-3-N-ethylaminopentane are dissolved in dilute sulfuric acid and diazotized with the calculated quantity of sodium nitrite. Then the reaction mass is immediately heated on the water-bath until any development of nitrogen has ceased. The resulting 1-[4'-(4''-hydroxyphenoxy)-phenyl]-2-methyl-3 - N - ethylaminopentane is recovered from this solution by precipitation by means of ammonia, then filtration and by finally washing the product. The melting point of the pure hydrochloride amounts to 170° C.

When working in the manner described in any one of the above examples, the following compounds may be made.

*Table*

| Substance | B. P. of the free base | M. P. of the hydrochloride |
|---|---|---|
| 1-[4'-(4''-methoxyphenoxy)-phenyl]-3-N-ethylaminopentane | B. P. $_{0.05}$ 162° C. | |
| 1-[4'-(4''-hydroxyphenoxy)-phenyl]-3-N-ethylaminopentane | | 170° C. |
| 1-[4'-(4''-methoxyphenoxy)-phenyl]-2-methyl-3-N-methylaminopentane | | |
| 1-(3'-phenoxy-4'-methoxyphenyl)-2-methyl-3-N-methylaminopentane | B. P. $_{0.5}$ 172° C. | |
| 1-(3'-phenoxy-4'-methoxyphenyl)-2-methyl-3-N-ethylaminopentane | B. P. $_{0.05}$ 172° C. | |
| 1-[3'-(4''-methyl-phenoxy)-4'-methoxyphenyl]-2-methyl-3-N-methylaminopentane | B. P. $_{0.1}$ 178° C. | |
| 1-[3'-(4''-methylphenoxy)-4'-methoxyphenyl]-2-methyl-3-N-ethylaminopentane | B. P. $_{0.05}$ 172° C. | |
| 1-[3'-(2''-methoxyphenoxy)-4'-methoxyphenyl]-2-methyl-3-N-methylaminopentane | B. P. $_{0.5}$ 187° C. | |
| 1-[3'-(2''-methoxyphenoxy)-4'-methoxyphenyl]-2-methyl-3-N-ethylaminopentane | B. P. $_{0.05}$ 171° C. | |
| 1-(4'-phenoxyphenyl)-2-methyl-3-N-methylaminopentane | B. P. $_{0.4}$ 182° C. | |
| 1-(4'-phenoxyphenyl)-2-methyl-3-N-ethylaminopentane | B. P. $_{0.3}$ 143° C. | |
| 1-[4'-(4''-hydroxyphenoxy)-phenyl]-2-methyl-3-N-methylaminopentane | B. P. $_{0.3}$ 147° C. | |
| 1-[3'-methyl-4'-(4''-methoxyphenoxy)-phenyl]-2-methyl-3-N-methylaminopentane | B. P. $_{0.2}$ 195° C. | |
| 1-[3'-(2''-methylphenoxy)-4'-methoxyphenyl]-2-methyl-3-N-methylaminopentane | B. P. $_{0.07}$ 173° C. | |
| | B. P. $_{0.3}$ 171° C. | |

What I claim is:

1. An araliphatic amine of the formula

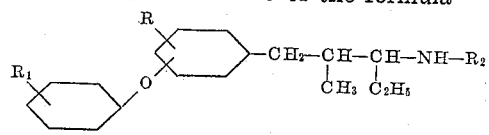

wherein R represents a member selected from the group consisting of hydrogen and methoxy, R₁ represents a member selected from the group consisting of hydrogen, methyl and methoxy, and R₂ represents a member selected from the group consisting of methyl and ethyl.

2. An araliphatic amine of the formula

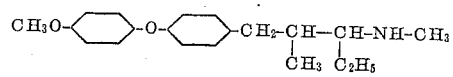

3. An araliphatic amine of the formula

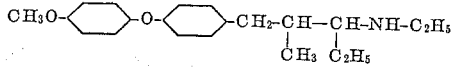

4. An araliphatic amine of the formula

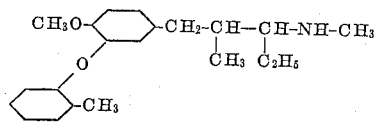

ROBERT BIEDERMANN.

REFERENCES CITED

The following references are of record in the file of this patent:

Kulz 2,407,167, Sept. 3, 1946 (published April 20, 1943, as A. P. C., S. N. 415,519½).